US009052924B2

(12) United States Patent
Whitechapel et al.

(10) Patent No.: US 9,052,924 B2
(45) Date of Patent: Jun. 9, 2015

(54) LIGHT-WEIGHT MANAGED COMPOSITE CONTROL HOSTING

(75) Inventors: David Andrew Whitechapel, Seattle, WA (US); Daniel A. Molina, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 1445 days.

(21) Appl. No.: 12/102,869

(22) Filed: Apr. 15, 2008

(65) Prior Publication Data
US 2009/0259951 A1 Oct. 15, 2009

(51) Int. Cl.
G06F 3/00 (2006.01)
G06F 9/44 (2006.01)
G06F 9/46 (2006.01)
G06F 13/00 (2006.01)
G06F 9/455 (2006.01)

(52) U.S. Cl.
CPC ................................. G06F 9/4443 (2013.01)

(58) Field of Classification Search
None
See application file for complete search history.

(56) References Cited

U.S. PATENT DOCUMENTS

| 5,729,537 | A * | 3/1998 | Billstrom ...................... 370/329 |
| 6,229,537 | B1 | 5/2001 | Sobeski et al. |
| 6,718,534 | B1 | 4/2004 | Carter et al. |
| 6,996,809 | B2 * | 2/2006 | Muhlestein et al. .......... 717/130 |
| 7,047,501 | B2 | 5/2006 | Morcos et al. |
| 2003/0090519 | A1 | 5/2003 | Subramanian et al. |
| 2004/0194020 | A1 | 9/2004 | Beda et al. |
| 2005/0091576 | A1 | 4/2005 | Relyea et al. |
| 2005/0091672 | A1 | 4/2005 | Debique et al. |
| 2005/0140694 | A1 | 6/2005 | Subramanian et al. |
| 2005/0262517 | A1 | 11/2005 | French |
| 2006/0101412 | A1 * | 5/2006 | Lev et al. ...................... 717/127 |

OTHER PUBLICATIONS

Ken Arnold et al., The Java Programming Language, 2006, Adison Wesley, Fourth Edditon, p. 141, 142.*
Whitechapel, "Build Office-Based Solutions Using WPF, WCF, and LINQ", http://msdn.microsoft.com/msdnmag/issues/07/12/VstoNet/default.aspx.
Heege, "Integrate Windows Forms into Your MFC Applications through C++ Interop", http://msdn.microsoft.com/msdnmag/issues/06/05/mixandmatch/default.aspx.
"Infragistics NetAdvantage for .Net + WPF—Summary", http://www.componentsource.com/products/infragistics-netadvantage-net-wpf/summary.html.
Nayyeri, "Host Windows Forms Controls in WPF", http://nayyeri.net/archive/2007/02/20/host-windows-forms-controls-in-wpf.aspx.

* cited by examiner

*Primary Examiner* — Craig Dorais
(74) *Attorney, Agent, or Firm* — Jim Banowsky; Leonard Smith; Micky Minhas

(57) ABSTRACT

A managed composite control can be directly (without intermediary hosting layers) hosted within an unmanaged hosting application. A managed control which can host managed composite controls is provided, the managed control being directly hostable within any unmanaged hosting control. An adapter (control) wraps the managed control content before the control content is moved into the unmanaged layer. Overloaded methods are provided that accept managed controls and manage communication between layers in such a way that instead of internal references expecting a user control, the internal references expect an object.

20 Claims, 5 Drawing Sheets

LIGHT-WEIGHT MANAGED COMPOSITE CONTROL HOSTING

BACKGROUND

A graphical user interface or GUI is a type of user interface that allows a user to interact with a computer and computer-controlled devices. A GUI presents graphical icons, visual indicators or graphical elements, sometimes in conjunction with text, labels or text navigation, to represent information and actions available to the user. Instead of offering only text menus, or requiring typed commands, an action is usually performed through direct manipulation of graphical interface elements.

A control is an interface element with which the user interacts, such as a window or a text box. A control provides a single interaction point for the direct manipulation of a particular kind of data. Controls are visual basic building blocks which, when combined in an application, hold the data processed by the application and control the available interactions on the data.

Families of common reusable controls for holding general information are available. Different implementations of these generic controls are often packaged together in toolkits, used to build GUIs. A number of different technologies and runtime libraries are available to support GUIs. Often several technologies are combined to present a desired GUI solution. Combining technologies is difficult, typically involving a number of layers and is apt to introduce fragility in the resulting solution.

SUMMARY

A managed composite control can be directly hosted within an unmanaged hosting application, without intermediary hosting layers. A managed hosting control which can host managed composite controls is provided, the managed hosting control being directly hostable within any unmanaged hosting control. Overloaded methods may be provided that accept managed composite controls and manage communication between layers in such a way that instead of internal references expecting a user control, the internal references expect an object.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

DETAILED DESCRIPTION

Overview

A composite control is a user-defined control that is created by combining existing controls. It can render a user interface that synthesizes properties from the properties of its component or child controls and can handle events raised by its child controls. It can also expose custom properties and events. A composite control is typically compiled and persisted as an assembly or executable and thus is typically reusable. A managed composite control executes under the management of a virtual machine instead of being executed directly by the computer's CPU.

Figure 1A:
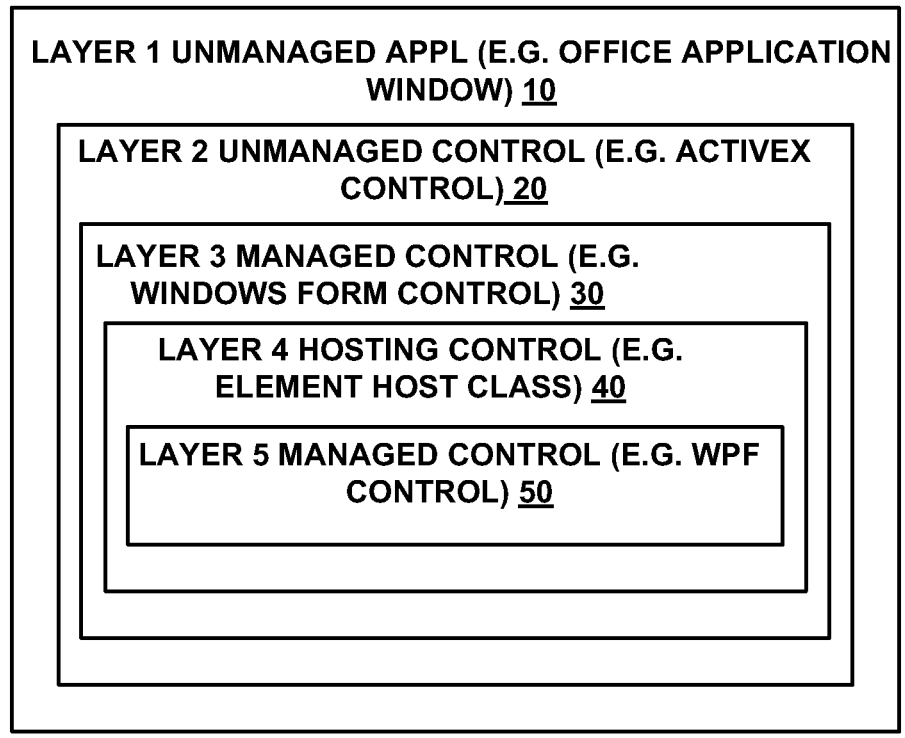
FIG. 1a is a block diagram of an existing system for hosting managed composite controls.

FIG. 1a illustrates a traditional method of hosting a managed composite control on a native application window. Traditionally, to place an unmanaged composite control on an application window, a multi-level hosting mechanism is employed. For example, a user might want to put a managed composite (e.g., WPF) control on a custom task pane that is implemented in a managed add-in for an Office application. To do this, the Office application provides a native (unmanaged) window (layer one 10, a first layer) for this purpose, which can host only unmanaged controls. The VSTO runtime then may provide an unmanaged ActiveX® control (layer two 20, a second layer) which can be placed in the native Office window. The VSTO ActiveX® control, in turn, can host any managed Windows Forms control (layer three 30, a third layer), including instances of the ElementHost class (layer four 40, a fourth layer), which in turn can host managed composite (e.g., WPF) controls (layer five 50, a fifth layer).

Thus, a control hosting stack may look like this:
1. Office native window, hosts:
  1.1. VSTO native ActiveX® control, which hosts:
   1.1.1. Any arbitrary Windows Forms control, which hosts:
    1.1.1.1. An instance of the .NET runtime ElementHost Windows Forms control, which hosts:
     1.1.1.1.1. Any arbitrary WPF control.

A runtime may provide several native ActiveX® hosting controls (level 1.1 above): for hosting controls in the custom task pane, in custom form regions, and on the surface of applications including but not limited to Word and Excel documents. For example, VSTO may provide a series of ActiveX® host controls that can be placed in Office applications and can host ActiveX®. Thus VSTO can host WPF using this multi-layered hosting approach because VSTO supports Windows Forms and Windows Forms supports WPF through ElementHost. However, in order for VSTO to support WPF this way, it must use WindowsForms even if the user did not use want to use Windows Forms.

In accordance with the subject matter disclosed herein, a managed hosting control may be provided that can host managed composite controls and is in turn directly hostable within any unmanaged application. That is, for example, in the example described above, the functions performed by an arbitrary Windows Forms control and an instance of the .NET runtime ElementHost Windows Forms control, that hosts an arbitrary WPF control, can be combined by providing a managed control which can host a managed composite control such as but not limited to a WPF control, where the managed hosting control is directly hostable within an unmanaged hosting control.

Figure 1B:
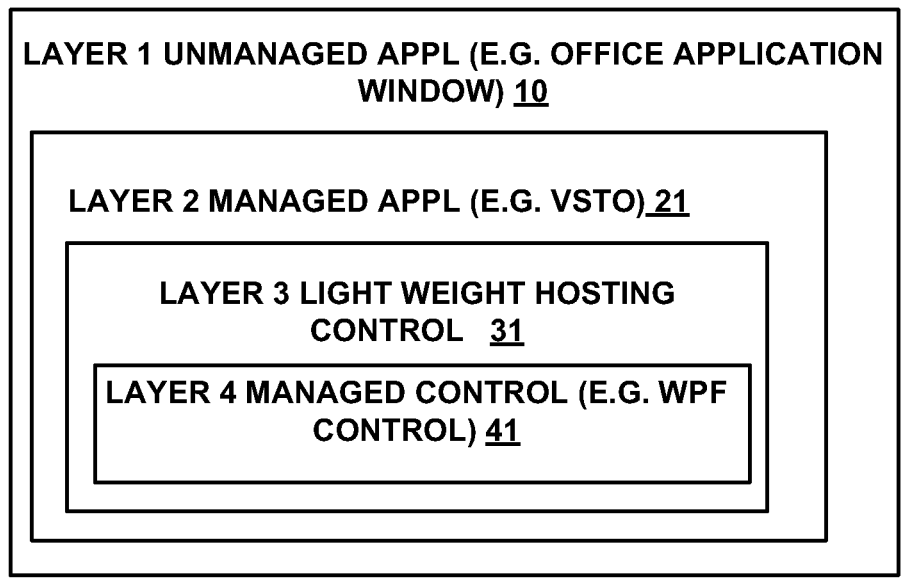
FIG. 1b is a block diagram of a system for hosting managed composite controls in accordance with aspects of the subject matter disclosed herein.

FIG. 1b illustrates an example of hosting a managed composite control (such as but not limited to a WPF control) on an unmanaged application window. For example, a user might want to put a WPF control on a custom task pane that is implemented in a managed add-in (e.g., VSTO) for an application (e.g., Office). To do this, the Office application provides a native (unmanaged) window (layer one 10, a first layer) for this purpose, which can host only unmanaged controls. A managed application (layer two 21, a second layer) such as the VSTO runtime may then provide a (managed code) light-weight hosting control (layer three 31, a third layer) which can be placed in the native Office window. The light-weight hosting control, in turn, can host any managed composite (e.g., WPF) control (layer four 41, a fourth layer). Thus, the control hosting stack for the example may look like this:

1. Office native window, hosts:
1.1. VSTO managed application, which hosts:
1.1.1. light-weight managed code control, which hosts:
1.1.1.1. Any arbitrary managed composite (e.g., WPF) control.

An adapter may be used to wrap managed composite control content and handle communications between layers. Overloads may be created to accept the managed composite control. For example, in order for VSTO to host a managed composite control such as a WPF natively, even though WPF does not support ActiveX®, an adapter (called VstoWpfAdapter) may wrap the WPF content before the content moves into the unmanaged layer, and may also implement the COM (Component Object Model) interfaces and translate the COM calls. A new WPF forms region may be added as can a new base class for the new WPF forms. The forms region manager may recognize the WPF forms kind and wrap the form region inside VstoWpfAdapter. Overloads may be created to accept the WPF control. All internal references may now expect an object instead of a user control. The WPF content may be wrapped in a custom proxy and the WPF control may be used as a container. Windows Forms and WPF containers may thus be provided, and the interoperability features of each may be employed to host WPF natively.

Windows Forms is the name given to a graphical user interface application programming interface (API) included as a part of Microsoft's .NET Framework. Windows Forms provides access to the native Microsoft Windows interface elements by wrapping the existing Windows API in managed code. The Windows Presentation Foundation (or WPF), formerly code-named Avalon, is a more recent graphical subsystem feature of the .NET Framework. It provides a consistent programming model for building applications and provides a clear separation between UI (user interface) and business logic. WPF enables rich control, design, and development of the visual aspects of Windows programs, unifying a host of application services including but not limited to user interface, 2D and 3D drawing, fixed and adaptive documents, advanced typography, vector graphics, raster graphics, animation, data binding, audio and video.

WPF and Windows Forms are different frameworks intended for the development of Windows applications. WPF lets developers do 3D and other rich media programming through one consistent platform layer rather than assembling the patchwork of technologies manually. WPF controls greatly speed a developer's ability to do rich media applications because of this single, consistent, comprehensive layer. Both frameworks expose their programming models as managed code, however, WPF and Windows Forms render controls in completely different ways.

Firstly, WPF is able to control or directly interact with GPUs (dedicated 3D hardware) whereas Windows Forms is not. A GPU is a Graphics Processing Unit (also occasionally called visual processing unit or VPU) and is a dedicated graphics rendering device for a personal computer, workstation, or game console. Modern GPUs are very efficient at manipulating and displaying computer graphics, and typically their highly parallel structure makes them more effective than general-purpose CPUs for a range of complex algorithms. A GPU can sit on top of a video card, or it can be integrated directly into the motherboard.

Secondly, WPF is DirectX-based, Windows Forms is GDI-based. GDI stands for Graphics Device Interface, an interface for representing graphical objects and transmitting them to output devices such as monitors and printers. GDI is responsible for tasks such as drawing lines and curves, rendering fonts and handling palettes. It is not directly responsible for drawing windows, menus, etc.

Thirdly, Windows Forms uses GDI and therefore are in direct control of painting. Every control has a handle (HWND) associated with it and therefore acts as a real window. Finally, WPF controls are handle-less and are rendered to a DirectX drawing surface working in retained mode. This implies that developers do not directly participate in the painting of the control but provides hints on what needs to be painted.

The core of WPF is a resolution-independent and vector-based rendering engine that is built to take advantage of modern graphics hardware. WPF extends the core with a comprehensive set of application-development features that include Extensible Application Markup Language (XAML), controls, data binding, layout, 2-D and 3-D graphics, animation, styles, templates, documents, media, text, and typography. WPF is included in the Microsoft .NET Framework, so applications that incorporate other elements of the .NET Framework class library can be built.

WPF provides significantly enhanced capabilities over previously-available programming models. The ability to use WPF controls is needed not only in WPF applications but also in non-WPF applications. Non-WPF application hosts can be managed or unmanaged, including but not limited to Microsoft Office applications such as Word and Excel.

WPF includes managed code and native code components; but the public API exposed is only available via managed code. The majority of WPF is in managed code. The composition engine which renders the WPF applications is a native component called the Media Integration Layer (MIL). MIL interfaces directly with DirectX and provides basic support for 2D and 3D surfaces, timer-controlled manipulation of contents of a surface with a view to exposing animation constructs at a higher level, and compositing the individual elements of a WPF application into a final 3D "scene" that represents the UI of the application and rendering it to the screen. The media codecs are also implemented in unmanaged code. In the managed world, PresentationCore provides a managed wrapper for MIL and implements the core services for WPF, including a property system that is aware of the dependencies between the setters and consumers of the property, a message dispatching system by means of a Dispatcher object to implement a specialized event system and services which can implement a layout system such as measurement for UI elements. PresentationFramework implements the end-user presentational features, including layouts, time-dependent, story-board based animations, and data binding.

WPF exposes a property system for WPF objects which inherit from DependencyObject, that is aware of the dependencies between the consumers of the property, and can trigger actions based on changes in properties. Properties can be either hard coded values or expressions, which are specific expressions that evaluate to a result or can be inherited from parent objects. WPF properties support change notifications, which invoke bound behaviors whenever some property of some element is changed. Custom behaviors can be used to propagate a property change notification across a set of WPF objects. This is used by the layout system to trigger a recalculation of the layout on property-changes, thus exposing a declarative programming style for WPF, whereby almost everything, from setting colors and positions to animating elements can be achieved by setting properties. This allows WPF applications to be written in XAML, which is a declarative mark-up language, by binding the keywords and attributes directly to WPF classes and properties.

The UI elements of an WPF application is maintained as a class of Visual objects. Visual objects provide a managed interface to a composition tree which is maintained by MIL. Each element of WPF creates and adds one or more composition nodes to the tree. The composition nodes contain rendering instructions, such as clipping and transformation instructions, along with other visual attributes. Thus the entire application is represented as a collection of composition nodes, which are stored in a buffer in the system memory. Periodically, MIL walks the tree and executes the rendering instructions in each node, thus compositing each element on to a DirectX surface, which is then rendered on-screen. MIL uses the painter's algorithm, where all the components are rendered from back of the screen to the front, which allows complex effects like transparencies to be easily achieved.

This rendering process is hardware accelerated using the GPU. The composition tree is cached by MIL, creating a retained mode graphics, so that any changes to the composition tree need only to be incrementally communicated to MIL. Thus, an application does not have to manage the repainting of the screen. Animations can be implemented as time-triggered changes to the composition tree. On the user visible side, animations are specified declaratively, by setting some animation effect to some element via a property and specifying the duration. The code-behind updates the specific nodes of the tree, via Visual objects, to represent both the intermediate states at specified time intervals as well as the final state of the element. MIL renders changes to the element automatically.

All WPF applications start with two threads: one for managing the UI and another background thread for handling rendering and repainting. Rendering and repainting are managed by WPF itself, without any developer intervention. The UI thread houses the Dispatcher (via an instance of DispatcherObject), which maintains a queue of UI operations that need to be performed (as a tree of Visual objects), sorted by priority. UI events, including changing a property that affects the layout, and user interaction events raised are queued up in the dispatcher, which invokes the handlers for the events. Event handlers may be used exclusively to update the properties to reflect new content for application responsiveness while the new content is generated or retrieved in a background thread. The render thread picks up a copy of the visual tree and walks the tree calculating which components will be visible and renders them to Direct3D surfaces. The render thread also caches the visual tree, so only changes to the tree need to be communicated, which will result in updating only the changed pixels. WPF supports an extensible layout model. Layout is divided into two phases: Measure and Arrange. The Measure phase recursively calls all elements and determines the size they will take. In the Arrange phase, the child elements are recursively arranged by their parents, invoking the layout algorithm of the layout module in use.

WPF provides interoperability with Win32, Microsoft's core set of application programming interfaces (APIs) available in the Microsoft Windows operating systems. Via hosting, WPF can be used inside existing Win32 code using the HwndSource class. The HwndSource class is designed to wrap WPF content, so that a WPF control can be used within a HwndSource object and that object can be used within a native Win32 application. The HwndSource class wraps WPF content in a Win32 window, exposing a Handle property, Hwnd.

Interoperability of WPF with Windows Forms is also possible through the use of the ElementHost and WindowsFormsHost classes. Windows Forms is the name given to the graphical user interface API included as a part of Microsoft's .NET Framework, providing access to the native Microsoft Windows interface elements by wrapping the existing Windows API in managed code. The ElementHost and WindowsFormsHost classes are designed to host WPF controls within Windows Forms controls. Windows Forms provides an ActiveX® client in the Control class. The .NET runtime library (Microsoft® Visual Studio®, Visual Studio Tools for Office) includes the HwndSource class and the ElementHost class. Thus, because VSTO supports Windows Forms and supports WPF through ElementHost, VSTO can host WPF controls. However, doing so requires additional layers.

Light-Weight Managed Composite Control Hosting

Figure 1C:
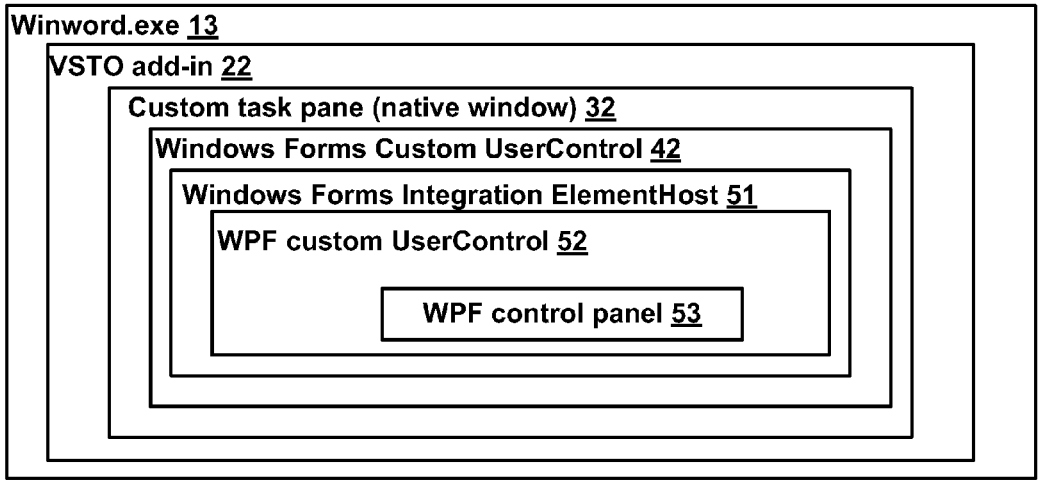
FIG. 1c is a block diagram of an existing runtime system for hosting managed composite controls.

FIG. 1c illustrates a block diagram of an existing runtime. The runtime stack includes: an unmanaged application such as Winword.exe 13 (a first layer) hosting a managed add-in such as VSTO 22 (a second layer). The managed add-inn 22 in turn hosts a native window (a custom task pane 32, a third layer) that hosts a Windows Forms Custom UserControl 42 (a fourth layer) that hosts a Windows Forms Integration Element Host 51 (a fifth layer) that hosts a WPF custom user Control 52 (a sixth layer) that hosts a WPF control 53 (a seventh layer).

Figure 1D:
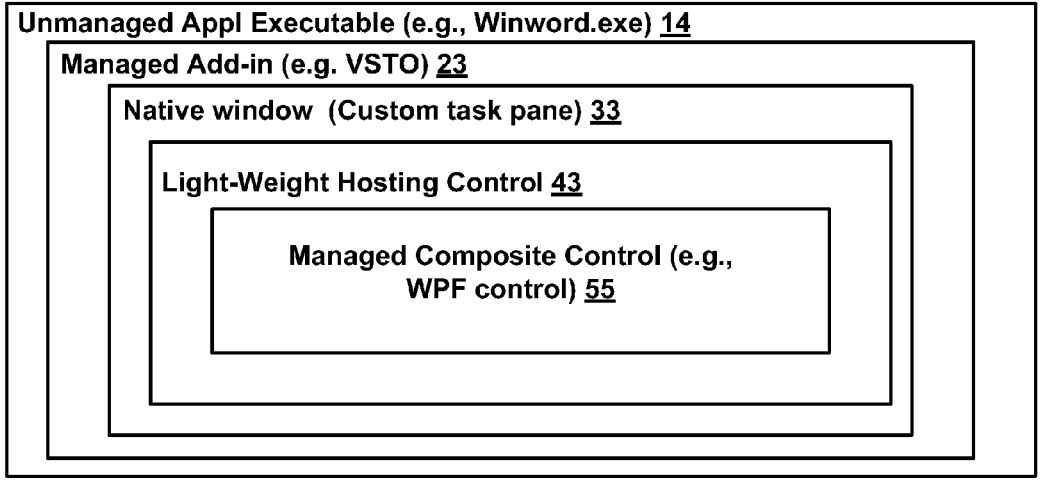
FIG. 1d is a block diagram of a runtime system for hosting managed composite controls in accordance with aspects of the subject matter disclosed herein.

FIG. 1d illustrates a block diagram of a runtime in accordance with aspects of the subject matter disclosed herein. The system which when executing creates the runtime of FIG. 1d may be implemented at least in part on a computer such as the one described below with respect to FIG. 3. The system may be a part of or an add-in to the integrated development environment described with respect to FIG. 4. The system may be a part of or an add-in to a suite of office programs. The runtime stack may include: an unmanaged application 14 such as Winword.exe (a first layer) hosting a managed add-in 23 such as VSTO (a second layer). The managed add-in 23 in turn may host a native window 33 (e.g., a custom task pane, a third layer) that hosts a light-weight hosting control 43 (a fourth layer) that hosts a managed composite control 55 (a fifth layer, e.g., a WPF control). The unmanaged application may be a windowing application such as Microsoft Windows or may be a non-windowing application such as Java.

Figures 2A, 2B:
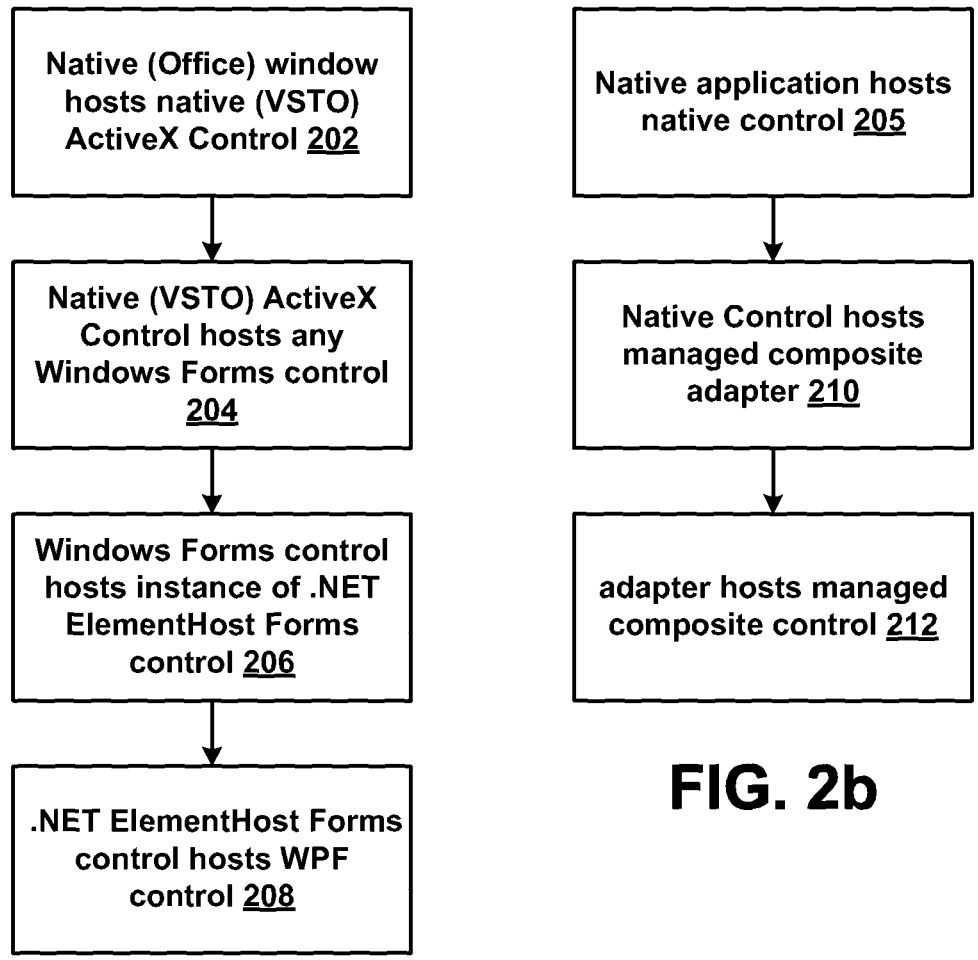
FIG. 2a is a flow diagram of a known method for hosting a managed composite control within a native application.
FIG. 2b is a flow diagram of an example of a method for hosting a managed composite control within a native application in accordance with aspects of the subject matter disclosed herein.

FIG. 2a illustrates a flow diagram of an existing method for hosting managed composite controls, such as WPF controls, in an unmanaged application. A native application such as an Office application hosts a native control such as an ActiveX® control at 202. The native (ActiveX®) control hosts any Windows Forms control at 204. The Windows Forms control hosts an instance of a .NET ElementHost forms control at 206. At 208 a .NET ElementHost Forms control hosts a WPF control.

FIG. 2b illustrates a flow diagram of an example of a method for hosting managed composite controls, such as but not limited to WPF controls, without intermediary hosting layers in an unmanaged application in accordance with aspects of the subject matter disclosed herein. At 205 a native application such as but not limited to an Office application hosts a native control such as an ActiveX® control. A native (unmanaged control) such as a native ActiveX® control hosts a hosting managed control such as a WPF adapter at 210 and at 212 the hosting managed control (e.g., WPF adapter control) hosts the managed composite (e.g., WPF) control.

For example, to host a WPF control in Microsoft Office, a VSTO runtime component may wrap the WPF control in a WPF adapter class (called VstoWpfAdapter). An adapter may "adapt" one interface for a class into one that a client expects. An adapter typically allows classes to work together that normally could not work together because of incompatible interfaces, by wrapping its own interface around that of an already existing class. An adapter may also be responsible for handling any logic necessary to transform data into a form that is useful for the consumer. For example, if multiple Boolean values are stored as a single integer but a consumer requires a "true"/"false", the adapter may be responsible for extracting the appropriate values from the integer value. VstoWpfAdapter may implement the COM interfaces expected by the native ActiveX® hosting control at 202. It may also translate COM calls coming from the native ActiveX® hosting control at 202 into WPF commands for the WPF control at 212 as well as translating WPF commands from the WPF control at 212 into COM calls for the ActiveX® hosting control at 205. By means of VstoAWpfAdapter, both the native ActiveX® host control and the WPF control communicate in a transparent way. Additionally, the VSTO runtime may expose new method overloads for developers so that a developer can provide one or more WPF control to be hosted.

Example of a Suitable Computing Environment

Figure 3:
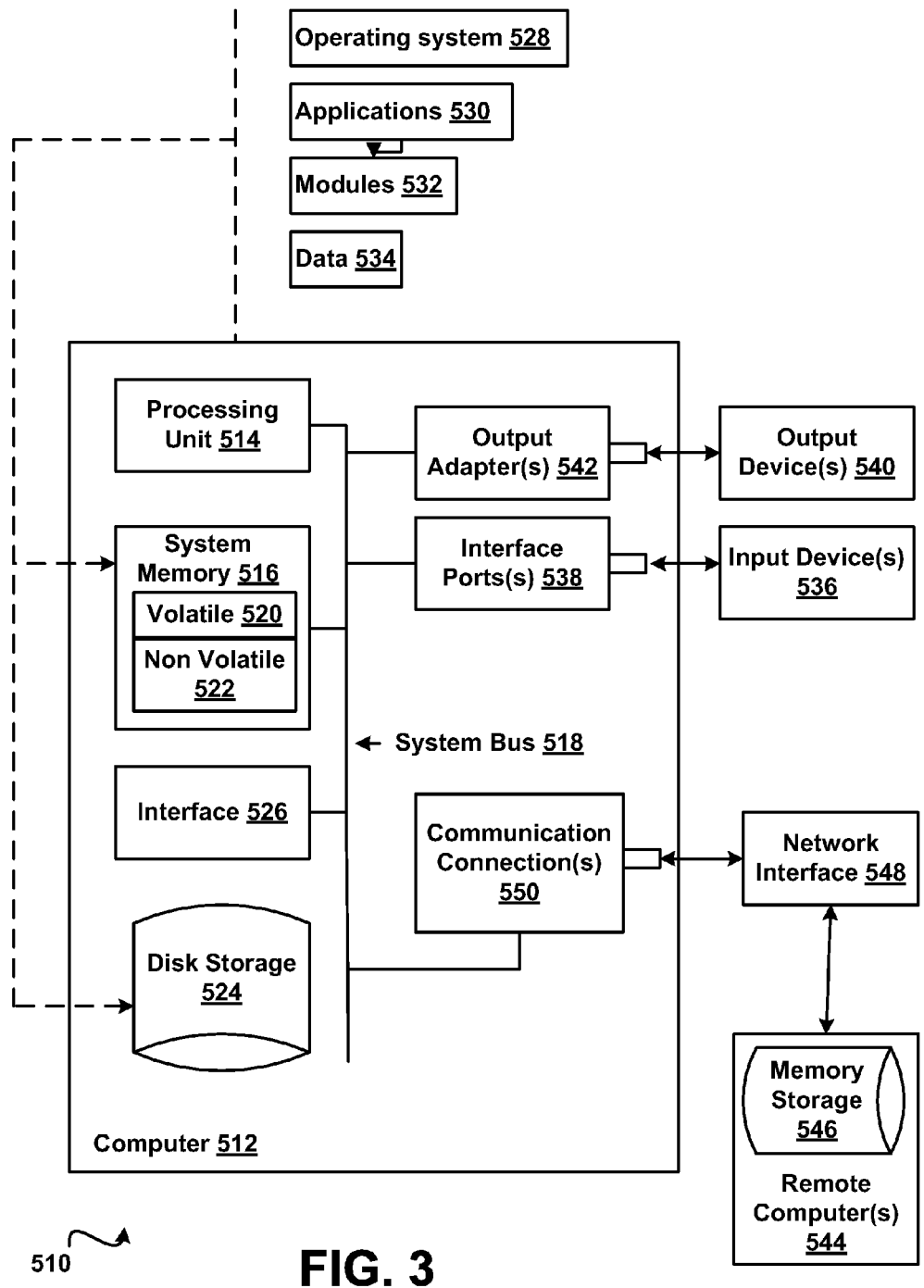
FIG. 3 is a block diagram illustrating an example of a computing environment in which aspects of the subject matter disclosed herein may be implemented.

In order to provide context for various aspects of the subject matter disclosed herein, FIG. 3 and the following discussion are intended to provide a brief general description of a suitable computing environment 510 in which various embodiments may be implemented. While the subject matter disclosed herein is described in the general context of computer-executable instructions, such as program modules, executed by one or more computers or other computing devices, those skilled in the art will recognize that portions of the subject matter disclosed herein can also be implemented in combination with other program modules and/or a combination of hardware and software. Generally, program modules include routines, programs, objects, components, data structures, etc. that perform particular tasks or implement particular data types. Typically, the functionality of the program modules may be combined or distributed as desired in various embodiments. The computing environment 510 is only one example of a suitable operating environment and is not intended to limit the scope of use or functionality of the subject matter disclosed herein.

With reference to FIG. 3, a general purpose computing device in the form of a computer 512 is described. Computer 512 may include a processing unit 514, a system memory 516, and a system bus 518. The processing unit 514 can be any of various available processors. Dual microprocessors and other multiprocessor architectures also can be employed as the processing unit 514. The system memory 516 may include volatile memory 520 and nonvolatile memory 522. Nonvolatile memory 522 can include read only memory (ROM), programmable ROM (PROM), electrically programmable ROM (EPROM) or flash memory. Volatile memory 520 may include random access memory (RAM) which may act as external cache memory. The system bus 518 couples system components including the system memory 516 to the processing unit 514. The system bus 518 can be any of several types including a memory bus, memory controller, peripheral bus, external bus, or local bus and may use any variety of available bus architectures.

Computer 512 typically includes a variety of computer readable media such as volatile and nonvolatile media, removable and non-removable media. Computer storage media may be implemented in any method or technology for storage of information such as computer readable instructions, data structures, program modules or other data. Computer storage media includes, but is not limited to, RAM, ROM, EEPROM, flash memory or other memory technology, CDROM, digital versatile disks (DVD) or other optical disk storage, magnetic cassettes, magnetic tape, magnetic disk storage or other magnetic storage devices, or any other medium which can be used to store the desired information and which can be accessed by computer 512.

It will be appreciated that FIG. 3 describes software that can act as an intermediary between users and computer resources. This software may include an operating system 528 which can be stored on disk storage 524, and which can control and allocate resources of the computer system 512. System applications 530 take advantage of the management of resources by operating system 528 through program modules 532 and program data 534 stored either in system memory 516 or on disk storage 524. It will be appreciated that computers can be implemented with various operating systems or combination s of operating systems.

A user can enter commands or information into the computer 512 through an input device(s) 536. Input devices 536 include but are not limited to a pointing device such as a mouse, trackball, stylus, touch pad, keyboard, microphone, and the like. These and other input devices connect to the processing unit 514 through the system bus 518 via interface port(s) 538. An interface port(s) 538 may represent a serial port, parallel port, universal serial bus (USB) and the like. Output devices(s) 540 may use the same type of ports as do the input devices. Output adapter 542 is provided to illustrate that there are some output devices 540 like monitors, speakers and printers that require special adapters. Output adapters 542 include but are not limited to video and sound cards that provide a connection between the output device 540 and the system bus 518. It should be noted that other devices and/or systems or devices such as remote computer(s) 544 provide both input and output capabilities.

Computer 512 can operate in a networked environment using logical connections to one or more remote computers, such as a remote computer(s) 544. The remote computer 544 can be a personal computer, a server, a router, a network PC, a peer device or other common network node, and typically includes many or all of the elements described above relative to the computer 512, although only a memory storage device 546 has been illustrated in FIG. 5. Remote computer(s) 544 can be logically connected via communication connection 550. Network interface 548 encompasses communication networks such as local area networks (LANs) and wide area networks (WANs) but may also include other networks. Communication connection(s) 550 refers to the hardware/software employed to connect the network interface 548 to the bus 518. Connection 550 may be internal to or external to computer 512 and include internal and external technologies such as modems (telephone, cable, DSL and wireless) and ISDN adapters, Ethernet cards and so on.

It will be appreciated that the network connections shown are examples only and other means of establishing a communications link between the computers may be used. One of ordinary skill in the art can appreciate that a computer 512 or other client device can be deployed as part of a computer network. In this regard, the subject matter disclosed herein man pertain to any computer system having any number of memory or storage units, and any number of applications and processes occurring across any number of storage units or volumes. Aspects of the subject matter disclosed herein may apply to an environment with server computers and client computers deployed in a network environment, having remote or local storage. Aspects of the subject matter disclosed herein may also apply to a standalone computing device, having programming language functionality, interpretation and execution capabilities.

Figure 4:
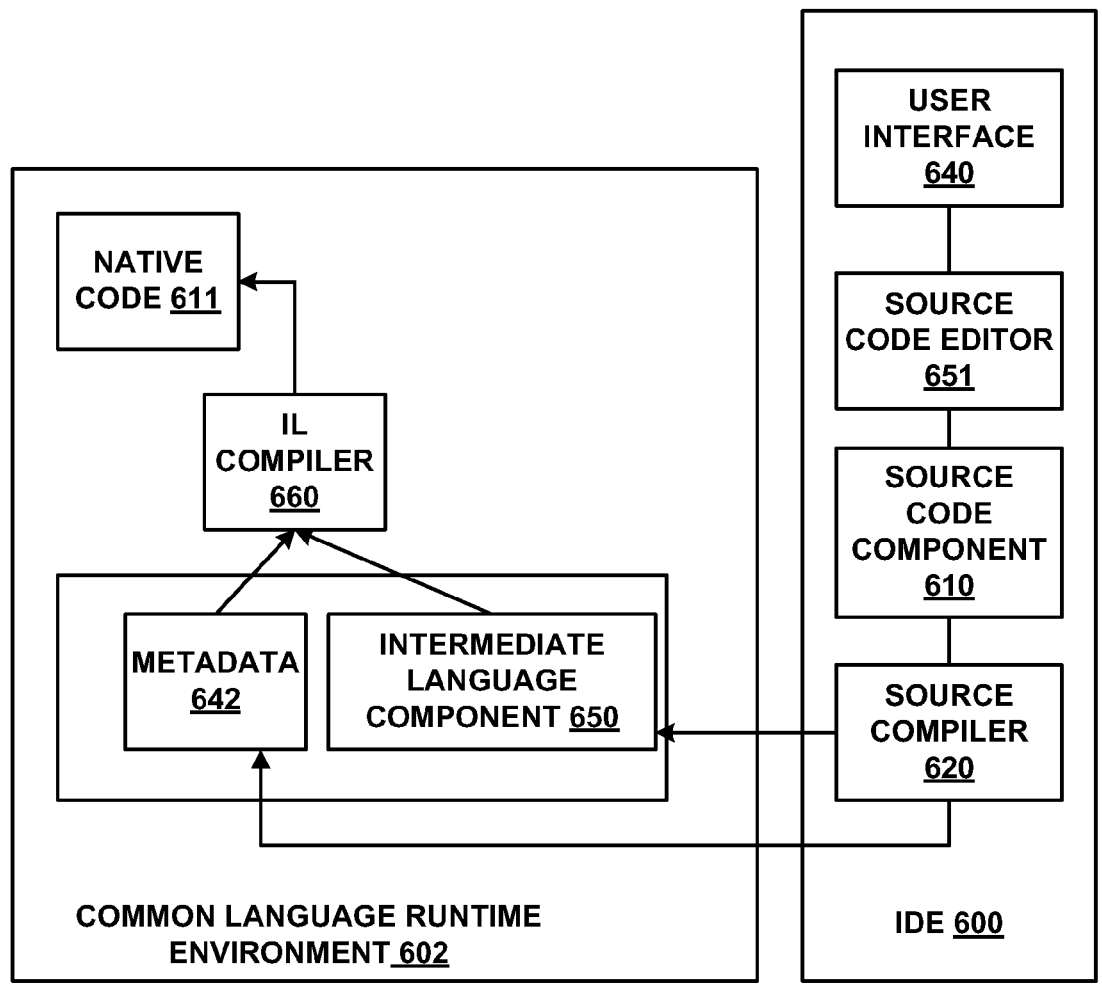
FIG. 4 is a block diagram of an example of an integrated development environment in accordance with aspects of the subject matter disclosed herein.

FIG. 4 illustrates an integrated development environment (IDE) 600 and Common Language Runtime Environment 602. An IDE 600 may allow a user (e.g., developer, programmer, designer, coder, etc.) to design, code, compile, test, run, edit, debug or build a program, set of programs, web sites, web applications, and web services in a computer system. Software programs can include source code (component 610), created in one or more source code languages (e.g., Visual Basic, Visual J#, C++. C#, J#, Java Script, APL, COBOL, Pascal, Eiffel, Haskell, ML, Oberon, Perl, Python, Scheme, Smalltalk and the like). The IDE 600 may provide a managed code development environment using the .NET framework. An intermediate language component 650 may be created from the source code component 610 and the native code component 611 using a language specific source compiler 620 and the native code component 611 (e.g., machine executable instructions) is created from the intermediate language component 650 using the intermediate language compiler 660 (e.g. just-in-time (JIT) compiler), when the application is executed. That is, when an IL application is executed, it is compiled while being executed into the appropriate machine language for the platform it is being executed on, thereby making code portable across several platforms. Alternatively, in other embodiments, programs may be compiled to native code machine language (not shown) appropriate for its intended platform.

A user can create and/or edit the source code component according to known software programming techniques and the specific logical and syntactical rules associated with a particular source language via a user interface 640 and a source code editor 651 in the IDE 600. Thereafter, the source code component 610 can be compiled via a source compiler 620, whereby an intermediate language representation of the program may be created, such as assembly 630. The assembly 630 may comprise the intermediate language component 650 and metadata 642. Application designs may be able to be validated before deployment.

The various techniques described herein may be implemented in connection with hardware or software or, where appropriate, with a combination of both. Thus, the methods and apparatus described herein, or certain aspects or portions thereof, may take the form of program code (i.e., instructions) embodied in tangible media, such as floppy diskettes, CD-ROMs, hard drives, or any other machine-readable storage medium, wherein, when the program code is loaded into and executed by a machine, such as a computer, the machine becomes an apparatus for practicing aspects of the subject matter disclosed herein. In the case of program code execution on programmable computers, the computing device will generally include a processor, a storage medium readable by the processor (including volatile and non-volatile memory and/or storage elements), at least one input device, and at least one output device. One or more programs that may utilize the creation and/or implementation of domain-specific programming models aspects, e.g., through the use of a data processing API or the like, may be implemented in a high level procedural or object oriented programming language to communicate with a computer system. However, the program(s) can be implemented in assembly or machine language, if desired. In any case, the language may be a compiled or interpreted language, and combined with hardware implementations.

While the subject matter disclosed herein has been described in connection with the figures, it is to be understood that modifications may be made to perform the same functions in different ways.

What is claimed:

1. A device comprising:
a memory storing a system executed at least in part on a computer that directly hosts a managed composite control within an unmanaged hosting application, the computer including a processing unit, the managed composite control executing under the management of a virtual machine instead of being executed directly by the processing unit, the system comprising:
a managed application that supplies, in a single hosting layer, a managed hosting control configured to directly host the managed composite control and transparently handle communication between the managed composite control and the unmanaged hosting application, the managed hosting control directly hostable within an unmanaged hosting control; and
the managed hosting control.

2. The system of claim 1, wherein the managed application is an integrated development environment add-in.

3. The system of claim 1, wherein the managed application is an add-in to a suite of office programs.

4. The system of claim 1, further comprising:
a native, unmanaged window, wherein the native, unmanaged window is incapable of hosting managed controls.

5. The system of claim 1, wherein the managed application is a windowing application.

6. The system of claim 4, wherein the managed application provides an adapter that wraps the managed composite control, implements an interface and translates calls between hosting layers.

7. A method, implemented with a computer having a processing unit, of hosting a managed composite control on an application window, the method comprising:
providing a native window, the native window capable of hosting only unmanaged controls; and
providing, in a single hosting layer, a managed light-weight hosting control directly hostable by the native window, the managed light-weight hosting control directly hosting the managed composite control and transparently handling communication between the managed composite control and the native window, the managed composite control executing under the management of a virtual machine instead of being executed directly by the processing unit.

8. The method of claim 7, wherein the managed composite control is a Windows Presentation Foundation (WPF) control.

9. The method of claim 7, wherein the managed light-weight hosting control is provided by a managed code add-in to an unmanaged application.

10. The method of claim 7, wherein an adapter wraps the managed composite control content and manages an interface between layers using a method overload.

11. The method of claim 7, wherein an adapter translates calls between the unmanaged window and the managed composite control.

12. A computer-readable storage medium storing computer-executable instructions which when executed cause a computing environment to:

provide an adapter, in a single hosting layer, the adapter directly hosting a managed composite control, the adapter directly hosted by an unmanaged hosting application without intermediate hosting layers, the adapter transparently handling communication between the managed composite control and the unmanaged hosting application, the managed composite control executing under the management of a virtual machine instead of being executed directly by a processing unit of the computing environment.

13. The computer-readable storage medium of claim 12, comprising further computer-executable instructions, which when executed cause the computing environment to:

host the managed composite control.

14. The computer-readable storage medium of claim 12, comprising further computer-executable instructions, which when executed cause the computing environment to:

host a managed composite control comprising a Windows Presentation Foundation (WPF) control.

15. The computer-readable storage medium of claim 12, comprising further computer-executable instructions, which when executed cause the computing environment to:

wrap the managed composite control content.

16. The computer-readable storage medium of claim 15, comprising further computer-executable instructions, which when executed cause the computing environment to:

manage communication between the layers to provide an object instead of a user control.

17. The computer-readable storage medium of claim 15, comprising further computer-executable instructions, which when executed cause the computing environment to:

use the managed composite control as a container.

18. The computer-readable storage medium of claim 15, comprising further computer-executable instructions, which when executed cause the computing environment to:

create an overload to accept the managed composite control.

19. The computer-readable storage medium of claim 15 comprising further computer-executable instructions, which when executed cause the computing environment to:

implement Component Object Model (COM) interfaces.

20. The computer-readable storage medium of claim 14, comprising further computer-executable instructions, which when executed cause the computing environment to:

translates Component Object Model (COM) calls.

* * * * *